(12) United States Patent
Dal Vecchio et al.

(10) Patent No.: US 10,195,922 B2
(45) Date of Patent: Feb. 5, 2019

(54) MOTOR VEHICLE WITH AN ADDITIONAL COOLING SYSTEM

(71) Applicant: WEIDPLAS GmbH, Rapperswil (CH)

(72) Inventors: Piero Dal Vecchio, Ermenswil (CH); Armin Muller, Kaltbrunn (CH); Christian Bolsterli, Durnsten (CH); Stefan Harke, Sinsheim (DE)

(73) Assignee: WEIDPLAS GmbH, Rapperswil (CH)

( * ) Notice: Subject to any disclaimer, the term of this patent is extended or adjusted under 35 U.S.C. 154(b) by 169 days.

(21) Appl. No.: 15/031,590

(22) PCT Filed: Sep. 30, 2014

(86) PCT No.: PCT/EP2014/070950
§ 371 (c)(1),
(2) Date: Apr. 22, 2016

(87) PCT Pub. No.: WO2015/058937
PCT Pub. Date: Apr. 30, 2015

(65) Prior Publication Data
US 2016/0288623 A1 Oct. 6, 2016

(30) Foreign Application Priority Data
Oct. 23, 2013 (CH) .................................. 01796/13

(51) Int. Cl.
*B60H 1/00* (2006.01)
*B60H 1/28* (2006.01)
(Continued)

(52) U.S. Cl.
CPC ........... *B60H 1/28* (2013.01); *B60H 1/00564* (2013.01); *B60H 1/00664* (2013.01); *B60H 1/242* (2013.01); *B60R 13/07* (2013.01)

(58) Field of Classification Search
CPC .. B60H 1/28; B60H 1/00564; B60H 1/00664; B60R 13/07
(Continued)

(56) References Cited

U.S. PATENT DOCUMENTS 3,301,484 A * 1/1967 De Coye De Castelet ................. B60H 1/00071
237/34
4,672,818 A * 6/1987 Roth ................... B60H 1/00364
62/239
(Continued)

FOREIGN PATENT DOCUMENTS

DE 14 55 848 B1 2/1971
DE 102 48 188 A1 5/2004
(Continued)

OTHER PUBLICATIONS

Omi, Yasumitsu, DE102005045882.pdf, "Air conditioner for vehicle", Apr. 2006, pp. 1-25.*
(Continued)

*Primary Examiner* — Gregory Huson
*Assistant Examiner* — Ryan Faulkner
(74) *Attorney, Agent, or Firm* — Sughrue Mion, PLLC (57) ABSTRACT

A motor vehicle (1) with a passenger compartment (3) and a motor chamber (2). A substantially closed area (7) is arranged in the motor chamber (2), and the area (7) is connected to the passenger compartment (3) via at least one first air outlet opening (18) in order to supply air from the area (7) into the passenger compartment (3). The area (7) is additionally connected to the air outside of the motor vehicle (1) via at least one air inlet opening (13) in order to supply air from outside of the motor vehicle into the area (7).
(Continued)

Furthermore, the area (7) is connected to at least one second air outlet opening (14) in order to discharge air out of the area (7).

17 Claims, 4 Drawing Sheets

(51) Int. Cl.
  *B60R 13/07* (2006.01)
  *B60H 1/24* (2006.01)
(58) Field of Classification Search
  USPC .......................................................... 454/147
  See application file for complete search history.

(56) References Cited

U.S. PATENT DOCUMENTS 5,335,719 A * 8/1994 Khelifa .............. B60H 1/00007
                                                         165/42
2006/0232106 A1    10/2006  Haas
2015/0013372 A1     1/2015  Harke

FOREIGN PATENT DOCUMENTS

DE      10 2005 045882 A1      4/2006
DE        102011100697 A1 *   11/2012  ............... B60H 1/28
EP           2 631 099 A1      8/2013

OTHER PUBLICATIONS

Breitmann, Uwe, DE102011100697 Translation.pdf, "Water separation tank for left hand drive passenger car", Nov 2012, pp. 1-14.*
International Preliminary Report on Patentability dated Apr. 26, 2016 for PCT/EP2014/070950.

International Search Report for PCT/EP2014/070950 dated Jan. 28, 2015.

* cited by examiner

MOTOR VEHICLE WITH AN ADDITIONAL COOLING SYSTEM

CROSS REFERENCE TO RELATED APPLICATIONS

This application is a National Stage of International Application No. PCT/EP2014/070950 filed Sep. 30, 2014, claiming priority based on Swiss Patent Application No. 01796/13 filed Oct. 23, 2013, the contents of all of which are incorporated herein by reference in their entirety.

TECHNICAL FIELD

The present invention relates to a motor vehicle and a method for operating such a motor vehicle.

PRIOR ART

DE 102 48 188 A1 discloses a compartment which is arranged in the engine compartment of a motor vehicle and which is constructed as an assembly compartment. The assembly compartment is closed all the way round except for an access opening which is directed toward the engine hood. In the assembly compartment there is produced a gas-tight air inlet connection to an air inlet opening which is arranged in the engine hood and there is integrated a water separator. Air outside the motor vehicle, which is also referred to as external air, now flows through the air inlet opening in the engine hood, into the assembly compartment and out of the assembly compartment to the passenger compartment.

In the motor vehicle according to DE 102 48 188 A1, the air is very powerfully heated outside the motor vehicle or the external air, in particular over the path thereof in the assembly compartment, that is to say, by approximately from 5° C. to approximately 15° C. That heating of the air is carried out, for example, in that the walls which delimit the path mentioned partially take up the heat which is produced during operation of the motor vehicle, such as, for example, during operation of the engine, and discharge it to the air which is from outside the motor vehicle and which is intended to be supplied to the passenger compartment, or to the external air which is intended to be supplied to the passenger compartment, and consequently that air is heated before it is introduced into the passenger compartment. Furthermore, for example, the walls mentioned are subjected to heating as a result of sunshine. The walls in turn discharge that heat taken up to the air which is from outside the motor vehicle and which is intended to be supplied to the passenger compartment or external air which is intended to be supplied to the passenger compartment and consequently heat that air again. In order to reduce the heating of the air which is from outside the motor vehicle and which is intended to be supplied to the passenger compartment or the external air which is intended to be supplied to the passenger compartment, in the prior art the walls are thermally insulated. This is very complex in terms of labour and consequently very expensive. That insulation is further thermally effective only to a limited extent. In the case of the motor vehicle according to DE 102 48 188 A1, the air which is from outside the motor vehicle and which is intended to be supplied to the passenger compartment or the external air which is intended to be supplied to the passenger compartment further has an undesirably high temperature if it flows into the passenger compartment out of the compartment constructed as the assembly compartment, in particular in hot climates, such as, for example, in tropical or sub-tropical climates, and/or at high temperatures of the air outside the motor vehicle, such as, for example, in summer. If, for example, the temperature of the air which is intended to be supplied to the passenger compartment outside the motor vehicle or the temperature of the external air which is intended to be supplied to the passenger compartment is 25° C., the temperature of the air outside the motor vehicle or the external air is from approximately 30° C. to approximately 40° C. before it flows into the passenger compartment. If the motor vehicle according to DE 102 48 188 A1 does not have any air-conditioning system, consequently, air having a high temperature of from approximately 30° C. to approximately 40° C. flows into the passenger compartment and impairs the driver. If the motor vehicle according to DE 102 48 188 A1 does have an air-conditioning system, the air-conditioning system must powerfully reduce the air temperature from a level of from approximately 30° C. to approximately 40° C., which is very energy-intensive.

SUMMARY OF THE INVENTION

Therefore, an object of the present invention is to provide a motor vehicle in which the air which is from outside the motor vehicle and which is intended to be supplied to the passenger compartment, if it has a high temperature, such as, for example, in hot climates and/or in summer, has a reduced temperature when it flows out of a compartment arranged in the engine compartment into the passenger compartment.

The present invention therefore provides a motor vehicle having a passenger compartment and an engine compartment, wherein a closed or at least substantially closed compartment is arranged in the engine compartment, wherein the compartment is connected to the passenger compartment via at least a first air outlet opening in order to supply air from the compartment into the passenger compartment, wherein the compartment is connected to the air outside the motor vehicle via at least one air inlet opening in order to supply air from outside the motor vehicle into the compartment and wherein the compartment is connected to at least a second air outlet opening in order to discharge air from the compartment.

Since the compartment of the motor vehicle according to the invention is connected to the at least one second air outlet opening, air can be transported from the compartment, such as, for example, as a result of the chimney effect, and consequently the temperature of the air arranged in the compartment decreases and therefore air having a lower temperature can be supplied to the passenger compartment from the compartment.

According to a development of the invention, the motor vehicle has means which are suitable for at least partially, preferably substantially completely, more preferably completely, preventing the supply of air from the compartment via the first air outlet opening into the passenger compartment. Those means consequently prevent air arranged in the compartment from being able to leave the compartment via the first air outlet opening and/or those means prevent, after the air arranged in the compartment has left the compartment via the first air outlet opening, the air from being able to be introduced into the passenger compartment. The motor vehicle preferably has a front wall, wherein the engine compartment is separated from the passenger compartment by the front wall and wherein the means are preferably arranged at the passenger compartment side of the front wall. The means comprise, for example, at least one air conveying means, such as, for example, at least one fan, which is suitable for transporting air from the compartment via the first, air outlet opening into the passenger compartment or, for example, at least one valve or, for example, at least one pushing member. If the air conveying means no longer operates or scarcely operates any longer, the supply of air from the compartment via the first air outlet opening to the passenger compartment is substantially completely prevented. The supply of air from the compartment via the first air outlet opening to the passenger compartment is at least partially, preferably substantially completely, more preferably completely, prevented during, for example, travel through a tunnel as a result, for example, of the harmful gases present in the tunnel. As a result of the at least partial, preferably substantially complete, more preferably complete, prevention of the supply of air from the compartment via the first air outlet opening to the passenger compartment, an improved discharge of air from the compartment via the second air outlet opening can be achieved. Furthermore, in the case of the motor vehicle according to the invention the dwell time of the air in the compartment is shorter in comparison with the dwell time of the air in the compartment in motor vehicles of the prior art because, as a result of the at least one second air outlet opening which is not provided in motor vehicles of the prior art, the air arranged in the compartment can leave the compartment continuously or discontinuously in the motor vehicle according to the invention. Since, in the motor vehicle according to the invention, the air arranged in the compartment can leave the compartment, or the dwell time thereof in the compartment is shorter, and furthermore the air leaving the compartment is replaced by the air which flows into the compartment via the at least one air inlet opening and which originates from outside the motor vehicle, the temperature of the air arranged in the compartment is lower in the motor vehicle according to the invention in comparison with the temperature of the air arranged in the compartment of a motor vehicle of the prior art, wherein, as long as the air supply from the compartment to the passenger compartment is prevented, the air remains in a state arranged in the compartment as a result of a lack of a way of being discharged from the compartment and, for example, is heated by the waste heat of the engine of the motor vehicle and/or the sunshine. If, in the motor vehicle of the prior art, the supply of air from the compartment to the passenger compartment is possible again, the heated air, which is arranged in the compartment and which may be charged with harmful gases, flows directly into the passenger compartment. As already described, the air arranged in the compartment of the motor vehicle according to the invention has a lower temperature than the air arranged in the compartment of the motor vehicle of the prior art. Consequently, in the motor vehicle according to the invention, if the means again allow the supply of air from the compartment via the first air outlet opening to the passenger compartment, air which is arranged in the compartment and which has a lower temperature in comparison can be supplied to the passenger compartment. Furthermore, the means in the motor vehicle according to the invention can be controlled in such a manner that the means again allow the supply of air from the compartment via the first air outlet opening to the passenger compartment only when the air arranged in the compartment has fewer or no harmful gases. In relation to this development of the invention, the means described consequently bring about a situation in which harmful gases can at least partially or completely be prevented from being able to be introduced into the passenger compartment.

According to a development of the invention, the motor vehicle has a wall which delimits the compartment. The wall which delimits the compartment can extend, for example, over the whole width of the motor vehicle or, for example, substantially over half the width of the motor vehicle. The wall which delimits the compartment is preferably at least partially produced from plastics material, more preferably substantially produced from plastics material, even more preferably completely produced from plastics material. However, the wall may also at least partially be produced from metal. The wall may at least partially be a component of the bodywork. The wall preferably comprises a bottom wall, a side wall and a top wall. Preferably, at least the bottom wall, the side wall and the top wall together delimit the compartment. Preferably, at least the bottom wall, the side wall and the top wall together form a box. Such a box can readily be fitted in the engine compartment and can readily be disassembled from the engine compartment again. At least one of the at least one first air outlet opening(s) is/are preferably arranged in the wall which delimits the compartment, in particular in the side wall of the wall and/or in the top wall of the wall. At least one of the at least one air inlet opening(s) is/are preferably arranged in the wall which delimits the compartment, in particular in the side wall of the wall and/or in the top wall of the wall. At least one of the at least one air inlet opening(s) can be bridged by an air-permeable grid so that, for example, no planar contaminations can be introduced into the air inlet opening. At least one of the at least one second air outlet opening(s) is/are preferably arranged in the wall which delimits the compartment, in particular in the side wall of the wall and/or in the top wall of the wall. At least one of the at least one second air outlet opening(s) can be bridged by an air-permeable grid so that, for example, no planar contaminations can be introduced into the second air outlet opening. Preferably at least a part-region of the top wall of the wall, more preferably the entire top wall of the wall, is fixed to the side wall of the wall in a releasable manner, more preferably in a releasable and air-tight manner. The top wall of the wall may, for example, at least partially or completely be formed by the engine hood. In this case, preferably at least one of the at least one air inlet opening(s) is/are arranged in the engine hood. The motor vehicle preferably has a front wall, wherein the engine compartment is preferably separated from the passenger compartment by the front wall and wherein at least a part-region of the side wall of the wall forms at least a part-region of the front wall.

According to a development of the invention, the motor vehicle has a first air guiding structure, wherein the compartment is connected to the passenger compartment via the first air outlet opening and via the first air guiding structure, such as, for example, at least one first tubular line, in order to supply air from the compartment to the passenger compartment. The motor vehicle preferably has a front wall, wherein the engine compartment is preferably separated from the passenger compartment by the front wall. The first air guiding structure extends, for example, through the front wall or adjoins, for example, the front wall at the passenger compartment side or adjoins, for example, the front wall at the engine compartment side. The means mentioned which are suitable for at least partially preventing the supply of air from the compartment via the first air outlet opening to the passenger compartment are, for example, arranged in the first air guiding structure.

According to a development of the invention, the motor vehicle has a second air guiding structure, wherein the compartment is connected to the air arranged in the engine compartment outside the compartment via the second air outlet opening and via the second air guiding structure, such as, for example, at least one second tubular line, in order to discharge air from the compartment to the air arranged in the engine compartment outside the compartment, is preferably connected to the air outside the motor vehicle in order to discharge air from the compartment to the air outside the motor vehicle.

According to a development of the invention, the motor vehicle has a third air guiding structure, wherein the compartment is connected to the air outside the motor vehicle or the external air via the air inlet opening and via the third air guiding structure, such as, for example, at least one third tubular line, in order to supply air outside the motor vehicle or external air to the compartment.

According to a development of the invention, the compartment is connected to a surrounding compartment which at least partially surrounds the compartment via at least one water discharge opening, in particular connected to a part-region of the engine compartment which at least partially surrounds the compartment, in order to discharge water from the compartment into the surrounding compartment which at least partially surrounds the compartment, in particular in order to discharge water from the compartment into the part-region of the engine compartment which at least partially surrounds the compartment. That water, in particular the gush-like water, can be introduced into the compartment via the at least one air inlet opening and/or via the at least one second air outlet opening. The water, in particular gush-like water, is, for example, rain water or water of a motor vehicle washing installation which can be introduced into the compartment, for example, via at least one air inlet opening in the engine hood and/or via at least one air inlet opening or a gap between the front windshield and the engine hood of the motor vehicle. This development of the invention affords the advantage that water arranged in the compartment can be separated from the compartment. The water discharge opening is preferably arranged in the wall which delimits the compartment, more preferably in the bottom wall of the delimiting wall.

According to a development of the invention, the compartment is constructed as an assembly compartment. For example, control devices, a battery, etc., can be arranged in such a compartment.

According to a development of the invention, the motor vehicle has a substantially closed water box, preferably a completely closed water box, which is at least partially arranged in the compartment, preferably substantially completely arranged in the compartment, even more preferably completely arranged in the compartment, so that at least a part-region of an outer side of the water box, preferably a majority of the outer side of the water box, more preferably substantially the entire outer side of the water box, even more preferably the entire outer side of the water box, is surrounded by air which is arranged in the compartment, wherein the water box has an inner compartment which is delimited by an inner side of the water box, at least one air supply opening in order to supply air outside the motor vehicle to the inner compartment, at least one air discharge opening in order to discharge air from the inner compartment to the passenger compartment and at least one water discharge opening in order to discharge water from the inner compartment, preferably in order to discharge water from the water box, wherein the inner compartment connects the air supply opening, the air discharge opening and the water discharge opening to each other. That development of the invention or the provision of a water box in the motor vehicle according to the invention affords the advantage that water, in particular gush-like water, can be separated from the air outside the motor vehicle or from the external air before the air is introduced into the passenger compartment, in particular before the air is introduced into any air-conditioning system of the motor vehicle, in the inner compartment of the water box. The gush-like water mentioned is, for example, rain water or water of a motor vehicle washing installation, which flows away, for example, via a front windshield of the motor vehicle and/or via the engine hood of the motor vehicle and then flows together with the air outside the motor vehicle or the external air into the inner compartment of the water box. Since the water box is at least partially arranged in the compartment, preferably substantially completely arranged in the compartment, even more preferably completely arranged in the compartment, at least a part-region of the outer side of the water box, preferably a majority of the outer side of the water box, more preferably substantially the entire outer side of the water box, even more preferably the entire outer side of the water box, is surrounded by air which is arranged in the compartment. Consequently, the compartment has at least a part-region in which the air which surrounds the outer side of the water box is arranged, wherein the at least one part-region of the compartment is connected via at least one of the at least one air inlet opening(s) in order to supply air outside the motor vehicle to the at least one part-region of the compartment and wherein the at least one part-region of the compartment is connected to at least one of the at least one second air outlet opening(s) in order to discharge air from the at least one part-region of the compartment. That air which is arranged in the compartment and which at least partially surrounds the outer side of the water box or the air which is arranged in the mentioned at least one part-region of the compartment has a thermally insulating effect with respect to the water box so that the air from outside the motor vehicle or the external air which flows through the inner compartment of the water box is heated to a lesser extent by the heat which occurs, for example, as a result of the operation of the motor vehicle, such as, for example, as a result of the operation of the engine, or as a result of sunshine. If, for example, the air which is arranged in the compartment and which surrounds the outer side of the water box or the air in the at least one part-region of the compartment reaches a specific temperature, at which it no longer acts or acts to an insufficient extent in a thermally insulating manner, the air which is arranged in the compartment and which surrounds the outer side of the water box or the air in the at least one part-region of the compartment can be replaced with air having a lower temperature by air from outside the motor vehicle or external air flowing via at least one of the at least one air inlet opening(s) into the at least one part-region of the compartment, and the heated air which is arranged in the mentioned at least one part-region of the compartment leaving the at least one part-region of the compartment via at least one of the at least one second air outlet opening(s). The air exchange may be a continuous or a discontinuous air exchange. There is preferably a continuous air exchange in the at least one part-region of the compartment in order to achieve a substantially constantly low air temperature in the compartment. This development of the invention or the provision of a water box in the motor vehicle according to the invention further affords the advantage that a thermal insulation of the wall which delimits the compartment can be dispensed with at least partially or even completely and/or the wall which delimits the compartment can be thermally insulated to a lesser extent. Additionally or alternatively, a thermal insulation of any components which supply air which originates from outside the motor vehicle or external air to the at least one part-region of the compartment can be dispensed with at least partially or even completely, or those components can be thermally insulated to a lesser extent. Those advantages mentioned with regard to the insulation are possible because the air which originates from outside the motor vehicle and which is intended to be supplied to the passenger compartment flows exclusively via the water box into the passenger compartment in this development of the invention. This development of the invention or the arrangement of the water box at least partially in the compartment further allows a thermal insulation of the water box to be able to be dispensed with at least partially or even completely or the water box to be able to be thermally insulated to a lesser extent. That advantage with regard to the insulation of the water box is possible because the air which is arranged in the compartment and which surrounds the outer side of the water box and which acts in a thermally insulating manner with respect to the water box or the air which is arranged in the at least one part-region of the compartment and which acts in a thermally insulating manner with respect to the water box can be replaced continuously or discontinuously, preferably continuously with air outside the motor vehicle having a lower temperature in comparison so that the air which is arranged in the compartment and which surrounds the outer side of the water box or the air which is arranged in the at least one part-region of the compartment cannot be heated excessively by the heat which is produced, for example, by the operation of the motor vehicle, in particular by the operation of the engine of the motor vehicle and, consequently, the air which is arranged in the at least one part-region of the compartment can carry out the insulation effect with respect to the water box. Since a thermal insulation of any components which supply air which originates from outside the motor vehicle or external air to the compartment can be dispensed with at least partially or even completely, or those components can be thermally insulated to a lesser extent and/or a thermal insulation of the wall which delimits the compartment can be dispensed with at least partially or even completely or the wall which delimits the compartment can be thermally insulated to a lesser extent and/or a thermal insulation of the water box can be dispensed with at least partially or even completely, or the water box can be thermally insulated to a lesser extent, in comparison with the prior art the waste heat of the engine or the sunshine can be utilized more effectively or selectively used at lower temperatures of the air outside the motor vehicle, such as, for example, in winter or in cold climates, in order to achieve a desired heating of the air which originates from outside the motor vehicle and which is intended to be supplied to the passenger compartment or the external air which is intended to be supplied to the passenger compartment. At low temperatures of the air outside the motor vehicle, such as, for example, in winter or in cold climates, consequently, any heating system of the motor vehicle according to the invention must work less in order to heat the air which originates from outside the motor vehicle and which is intended to be supplied to the passenger compartment or to heat the external air which is intended to be supplied to the passenger compartment and, consequently, energy can be saved. The motor vehicle according to the invention consequently has, in comparison with a motor vehicle of the prior art, the advantage that at low temperatures of the air outside the motor vehicle, such as, for example, in winter or in cold climates, the energy consumption is lower.

There is preferably arranged in the inner compartment of the water box at least one redirecting element which is used to separate water, in particular drop-like water, from the air flowing through the inner compartment. That preferred embodiment affords the advantage that water, in particular drop-like water, can be separated from the air flowing through the water box. Consequently, it is possible to reduce the risk that water, in particular drop-like water, may be introduced into the passenger compartment, in particular that water, in particular drop-like water, may be deposited in any filter which is arranged in any air-conditioning system of the motor vehicle. If water, in particular drop-like water, can be deposited in a filter of the air-conditioning system, there is the danger that the filter may be affected by fungi.

According to a development of the invention, the inner compartment of the water box is connected via the air supply opening to the air outside the motor vehicle in order to supply air outside the motor vehicle to the inner compartment of the water box.

According to a development of the invention, the inner compartment of the water box is connected to the passenger compartment via the air discharge opening in order to supply air from the inner compartment to the passenger compartment.

According to a development of the invention, at least one of the at least one air discharge opening(s) of the water box form(s) at least one of the at least one first air outlet opening(s) and/or at least one of the at least one air discharge opening(s) of the water box is connected to at least one of the at least one first air outlet opening(s) in fluid terms. In this context, the term "connected in fluid terms" is intended to mean that at least, for example, one gas, such as, for example, air, can flow from the at least one air discharge opening(s) to the at least one first air outlet opening(s) and vice versa, such as, for example, through at least one tubular line.

According to a development of the invention, at least one of the at least one air supply opening(s) of the water box form(s) at least one of the at least one air inlet opening(s) and/or at least one of the at least one air supply opening(s) of the water box is/are connected in fluid terms to at least one of the at least one air inlet opening(s). In this context, the term "connected in fluid terms" is intended to mean that at least, for example, one gas, such as, for example, air, and/or, for example, a liquid, such as, for example, water, can flow from the at least one air inlet opening(s) to the at least one air supply opening(s) and vice versa, such as, for example, through at least one tubular line.

According to a development of the invention, the water box comprises a wall which forms an inner side of the water box, wherein the inner side delimits the inner compartment. The wall preferably comprises a bottom wall, a side wall and a top wall. Preferably, at least the bottom wall, the side wall and the top wall together delimit the inner compartment. Preferably, the water discharge opening for discharging water from the inner compartment is arranged in the bottom wall, preferably arranged at the lowest location of the bottom wall. The bottom wall is preferably constructed in a conical manner. The water box is preferably produced at least partially from plastics material, more preferably substantially from plastics material, even more preferably completely from plastics material. However, the water box may also, for example, be produced at least partially from metal. The water box may also be formed at least partially by the bodywork. Preferably, the water box has at least one valve which can be opened and closed again, wherein the at least one water discharge opening is formed by the at least one valve. The valve is preferably produced from an elastomer material. The valve prevents external air from being able to be introduced into the inner compartment of the water box. The water discharge opening can, for example, be connected to the at least one part-region of the compartment in order to discharge water from the inner compartment of the water box into the at least one part-region of the compartment and/or the water discharge opening can, for example, be connected to a surrounding compartment which at least partially surrounds the compartment in order to discharge water from the inner compartment into the surrounding compartment. Preferably, at least the bottom wall, the side wall and the top wall together form a box. Such a box or such a water box can readily be fitted in the compartment and can readily be disassembled from the compartment again. It is also possible for the box or the water box to be formed at least partially, preferably completely, by the bodywork. The at least one air supply opening is preferably arranged in the side wall and/or in the top wall of the water box. The at least one air discharge opening is preferably arranged in the side wall and/or in the top wall of the water box. Preferably, the top wall is fixed to the side wall in a releasable manner, preferably in a releasable and air-tight manner. This embodiment affords the advantage that the inner compartment of the water box can be readily maintained.

According to a development of the invention, the compartment is connected to at least one air inlet opening which is arranged in at least one front region of the motor vehicle via at least one of the at least one air inlet opening (s), preferably via the at least one air inlet opening and via the mentioned third air guiding structure, in order to supply air outside the motor vehicle to the compartment. This development of the invention affords the advantage that air outside the motor vehicle or external air can be conveyed into the compartment during travel of the motor vehicle by means of dynamic pressure.

According to a development of the invention, the compartment is connected to at least one air inlet opening which is arranged in at least one lateral region of the motor vehicle via at least one of the at least one air inlet opening(s), preferably via the at least one air inlet opening and via the mentioned third air guiding structure, in order to supply air outside the motor vehicle to the compartment. Preferably, at least one of the at least one air inlet opening(s) is/are arranged in the lateral region in such a manner that air from outside the motor vehicle or external air can be conveyed into the compartment via the air inlet opening during travel of the motor vehicle by means of dynamic pressure.

According to a development of the invention, the compartment is connected to at least one air inlet opening which is arranged in at least one upper region of the motor vehicle via at least one of the at least one air inlet opening(s), preferably via the at least one air inlet opening and via the mentioned third air guiding structure, in order to supply air outside the motor vehicle to the compartment. Preferably, at least one of the at least one air inlet opening(s) is/are arranged in the upper region in such a manner that air from outside the motor vehicle or external air can be conveyed into the compartment via the air inlet opening during travel of the motor vehicle by means of dynamic pressure. At least one of the at least one air inlet opening(s) is/are preferably arranged in the engine hood of the motor vehicle and/or at least one of the at least one air inlet opening(s) is/are preferably arranged between an edge of the engine hood of the motor vehicle and a part-region of the motor vehicle which surrounds the front windshield of the motor vehicle.

The air supply opening which is arranged between the edge of the engine hood of the motor vehicle and the part-region of the motor vehicle which surrounds the front windshield of the motor vehicle is also referred to as the hood gap.

According to a development of the invention, the motor vehicle has at least one air conveying means in order to transport air outside the motor vehicle or external air into the compartment and to transport air out of the compartment. This development of the invention affords the advantage that a more reliable transport of air outside the motor vehicle or external air into the compartment and a more reliable transport of this air out of the compartment are ensured. Furthermore, a more reliable exchange of the air arranged in the compartment can be ensured. If a water box is arranged in the compartment, the air conveying means which is preferably constructed as a fan is preferably arranged in the at least one part-region of the compartment. This development of the invention affords the advantage that a more reliable transport of air outside the motor vehicle or external air into the at least one part-region of the compartment and a more reliable transport of this air out of the at least one part-region of the compartment are ensured. Furthermore, a more reliable exchange of the air arranged in the at least one part-region of the compartment can be ensured.

According to a preferred embodiment, the at least one air conveying means is at least one fan which is preferably arranged in the compartment. The fan affords the advantage that a discontinuous and/or a continuous air flow can be brought about in the compartment or in the at least one part-region of the compartment. In the event that the motor vehicle according to the invention has a water box as described above, the at least one air conveying means which is preferably at least one fan is preferably arranged in the at least one part-region of the compartment. Preferably, the at least one fan is constructed in such a manner that it can be controlled.

According to another preferred embodiment, the at least one air conveying means comprises at least the components of the motor vehicle according to the invention which can cause the motor vehicle to move. The mentioned components of the motor vehicle cause the motor vehicle according to the invention to move and, as a result of the dynamic pressure brought about by the movement, air outside the motor vehicle is preferably transported into the compartment and out of the compartment. That preferred embodiment affords the advantage that it is possible to dispense with an electrically operated air conveying means for the air transport into the compartment and out of the compartment, such as, for example, a fan, and consequently the energy consumption of the motor vehicle according to the invention is lower.

According to another preferred embodiment, the at least one air conveying means comprises at least the at least one fan and the components of the motor vehicle according to the invention which can cause the motor vehicle to move. The mentioned components of the motor vehicle cause the motor vehicle according to the invention to move and, as a result of the dynamic pressure brought about by the movement, air outside the motor vehicle is preferably transported in the compartment and out of the compartment. The fan is preferably not in operation during the movement of the motor vehicle, which movement produces adequate dynamic pressure, and is preferably switched on when the motor vehicle is stopped and optionally during slow travel of the motor vehicle, during which insufficient dynamic pressure can be produced, so that, when the motor vehicle is stopped and/or during slow travel of the motor vehicle, air outside the motor vehicle or external air can further be transported into the compartment and out of the compartment.

According to another preferred embodiment, the at least one air conveying means comprises at least the at least one fan and the components of the motor vehicle according to the invention which can cause the motor vehicle to move and at least one air line. The mentioned components of the motor vehicle cause the motor vehicle according to the invention to move and, as a result of the dynamic pressure brought about by the movement, air outside the motor vehicle is preferably transported in the compartment and out of the compartment. The fan is preferably not in operation during the movement of the motor vehicle, which movement produces adequate dynamic pressure, and is preferably switched on when the motor vehicle is stopped and optionally during slow travel of the motor vehicle, during which insufficient dynamic pressure can be produced, so that, when the motor vehicle is stopped and/or during slow travel of the motor vehicle, air outside the motor vehicle or external air can further be transported into the compartment and out of the compartment. The at least one air line preferably transports air outside the motor vehicle or external air into the compartment from at least one front region of the motor vehicle and/or from at least one lateral region of the motor vehicle and/or from at least one upper region of the motor vehicle.

According to a development of the invention, the motor vehicle has at least one air conveying means which is preferably constructed as at least one fan in order to transport air from the compartment via the first air outlet opening into the passenger compartment. The motor vehicle preferably has a front wall, wherein the engine compartment is separated from the passenger compartment by the front wall and wherein the at least one air conveying means is preferably arranged at the passenger compartment side of the front wall.

According to a development of the invention, the motor vehicle has an air-conditioning system which is connected to the passenger compartment in order to supply air from the air-conditioning system to the passenger compartment, wherein the compartment is connected to the air-conditioning system via the first air outlet opening in order to supply air from the compartment to the air-conditioning system. Preferably, the air-conditioning system has the means already described which are suitable for preventing the supply of air from the compartment to the passenger compartment via the first air outlet opening at least partially, preferably substantially completely, more preferably completely. Those means comprise, as already mentioned, for example, at least one air conveying means, such as, for example, at least one fan, which is suitable for transporting air from the compartment via the first air outlet opening into the passenger compartment or, for example, at least one valve or, for example, at least one sliding member. The means preferably comprise the air conveying means and the at least one valve or the air conveying means and the at least one sliding member. The air-conditioning system may, in addition to the means mentioned, further contain, for example, at least one evaporator for cooling the air which flows through the air-conditioning system and/or at least one filter and/or at least one heating unit for heating the air which flows through the air-conditioning system. The motor vehicle preferably has a front wall, wherein the engine compartment is separated from the passenger compartment by the front wall and wherein the air-conditioning system is preferably arranged at the passenger compartment side of the front wall. Since, as already described, air having a lower temperature can be supplied from the compartment to the passenger compartment in the motor vehicle according to the invention, in comparison with motor vehicles of the prior art, the motor vehicle according to the invention which comprises an evaporator can be operated in a more energy-saving manner than a motor vehicle of the prior art which comprises an evaporator since the evaporator of the motor vehicle according to the invention has to operate less and consequently the motor vehicle according to the invention can be operated in a more energy-saving manner.

The air-conditioning system is preferably constructed in such a manner that the air-conditioning system can be operated with air recirculation operation. In the event that the air-conditioning system is in air recirculation operation, no air can preferably be introduced from the compartment into the air-conditioning system. During air recirculation operation, air flows out of the passenger compartment into the air-conditioning system and that air which has flowed into the air-conditioning system flows back into the passenger compartment again at least partially, preferably substantially completely, more preferably completely.

The air-conditioning system preferably has at least one evaporator which generates condensation water, wherein the motor vehicle has means for supplying the condensation water to the compartment and for spraying the condensation water supplied to the compartment in the compartment in order to bring about an evaporation cooling of the air arranged in the compartment.

According to a development of the invention, the motor vehicle has a front wall, wherein the engine compartment is separated from the passenger compartment by the front wall.

According to a development of the invention, the compartment is connected to the air arranged in the engine compartment outside the compartment via the second air outlet opening in order to discharge air from the compartment into the air arranged in the engine compartment outside the compartment, preferably connected to the air outside the motor vehicle in order to discharge air from the compartment into the air outside the motor vehicle.

There is further set out a method for operating the motor vehicle according to the invention as described above, wherein the motor vehicle is operated in such a manner that
    air flows between at least one of the at least one air inlet opening(s) and at least one of the at least one second air outlet opening(s) and between at least one additional of the at least one air inlet opening(s) and at least one of the at least one first air outlet opening(s) at the same time, or that
    air flows between at least one of the at least one air inlet opening(s) and at least one of the at least one second air outlet opening(s) and between at least one of the at least one air inlet opening(s) and at least one of the at least one first air outlet opening(s) in a manner offset over time.

According to a development of the invention, the air which flows between the at least one of the at least one air inlet opening(s) and the at least one of the at least one second air outlet opening(s) is spatially separated from the air which flows between the at least one additional of the at least one air inlet opening(s) and the at least one of the at least one first air outlet opening(s) at the same time. This development of the invention affords the advantage that the air which flows between the at least one of the at least one air inlet opening(s) and the at least one of the at least one second air outlet opening(s) cannot become mixed with the air which flows between the at least one additional of the at least one air inlet opening(s) and the at least one of the at least one first air outlet opening(s) at the same time. This is the case, for example, in the development of the invention in relation to the motor vehicle comprising the water box which is closed or at least substantially closed.

BRIEF DESCRIPTION OF THE DRAWINGS

Preferred embodiments of the invention will be described below with reference to the drawings which only serve for explanatory purposes and are not intended to be interpreted in a limiting manner. In the drawings.

DESCRIPTION OF PREFERRED EMBODIMENTS

FIGS. 1 to 4 show motor vehicles according to different embodiments according to the invention. In the embodiments according to the invention shown in FIGS. 1 to 4, identical, similar or similarly acting features are indicated with the same reference numerals.

Figure 1:
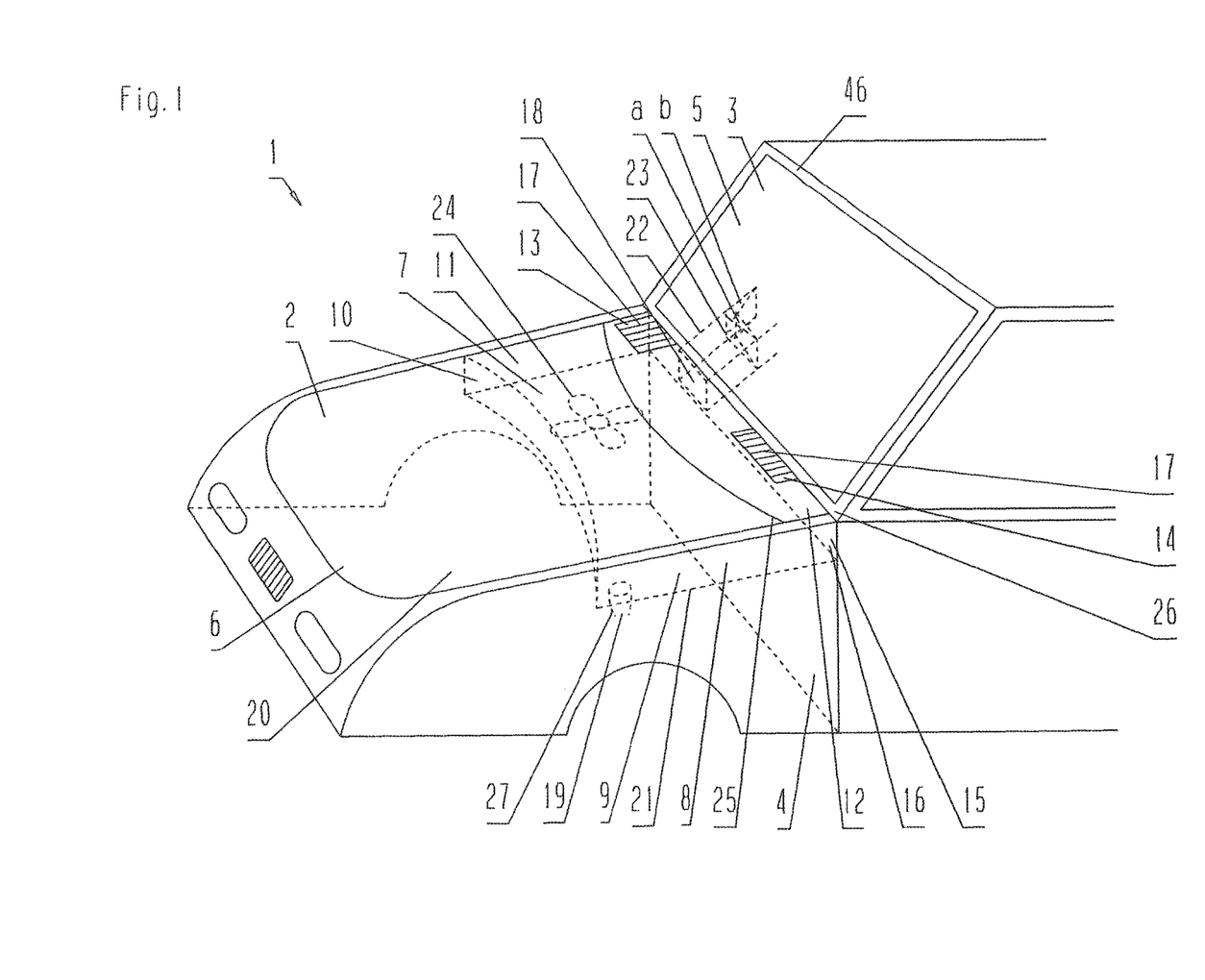
FIG. 1 is a schematic spatial view of a front region of a first embodiment of the motor vehicle according to the invention.

FIG. 1 is a schematic spatial view of a front region of a first embodiment of a motor vehicle according to the invention which is in the form of a car in this instance. This motor vehicle 1 comprises an engine compartment 2 and a passenger compartment 3, wherein the engine compartment 2 is separated from the passenger compartment 3 by a front wall 4. The motor vehicle 1 has a front windshield 5 which is surrounded by a part-region 26 of the bodywork 46 of the motor vehicle 1 and an engine hood 6, wherein the engine hood 6 covers the engine compartment 2 and wherein, as evident in FIG. 1, a gap 12 is arranged between the mentioned part-region 26 of the bodywork 46 and an edge 25 of the engine hood 6. There is arranged in the engine compartment 2 a completely closed compartment 7 which is preferably in the form of an assembly compartment which is delimited by a wall 8 which is illustrated with broken lines and which comprises a bottom wall 9, a side wall 10 and a top wall 11 which together form a box 21 which extends substantially over the entire width of the motor vehicle 1. The top wall 11 is preferably fixed to the peripheral side wall 10 which extends upward from the bottom wall 9 in a releasable manner, more preferably in a releasable and air-tight manner. Consequently, the compartment 7 can be maintained more easily. As can be seen in FIG. 1, a part-region 15 of the side wall 10 forms a part-region 16 of the front wall 4. There is arranged in the top wall 11 an air inlet opening 13 which is arranged under the gap 12, wherein the air inlet opening 13 is connected to the gap 12 which forms an air inlet opening which is arranged in an upper region of the motor vehicle 1 in order to supply air outside the motor vehicle 1 or external air to the compartment 7 via the gap 12 and via the air inlet opening 13. Furthermore, a second air outlet opening 14 which is also arranged under the gap 12 is arranged in the top wall 11, wherein the compartment 7 is connected to the air outside the passenger compartment 3 via the second air outlet opening 14 and via the gap 12 which also forms an air discharge opening which is arranged in an upper region of the motor vehicle 1 in order to discharge air from the compartment 7. A grid 17 is arranged in the air inlet opening 13 and in the second air outlet opening 14 in order to prevent in particular the introduction of planar components into the air inlet opening 13 or into the second air outlet opening 14. In addition to air, water, in particular gush-like water which is, for example, rain water or water of a motor vehicle washing installation, can further be introduced into the compartment 7 via the gap 12 and via the air inlet opening 13 and/or via the second air outlet opening 14. In order to discharge the water reaching the compartment 7 from the compartment 7, the compartment 7 can be connected to a surrounding compartment 20 which partially surrounds the compartment 7 and which forms a part-region of the engine compartment 2 via a water discharge opening 19 arranged in the bottom wall 9. The box 21 has a valve 27 which forms the water discharge opening 19, wherein the valve 27 is in the open state in the case illustrated in FIG. 1 and the compartment 7 is consequently connected to the surrounding compartment 20 and consequently water which is arranged in the compartment 7 can be discharged from the compartment 7 into the surrounding compartment 20. The valve 27 can close automatically so that no air can be introduced from the surrounding compartment 20 into the compartment 7 and subsequently into the passenger compartment 3. Furthermore, a first air outlet opening 18, via which the compartment 7 is connected to the passenger compartment 3, is arranged in the part-region 15 of the side wall 10 or in the part-region 16 of the front wall 4 in order to supply air from the compartment 7 to the passenger compartment 3. As can be seen in FIG. 1, a first tubular line 22 which is illustrated with broken lines adjoins the box 21 so that the compartment 7 is connected to the passenger compartment 3 via the first air outlet opening 18 and via the first tubular line 22 in order to supply air from the compartment 7 to the passenger compartment 3 via the first air outlet opening 18 and via the first tubular line 22. As can be seen in FIG. 1, means which are illustrated with broken lines and which are constructed as a valve 23 are arranged in the first tubular line 22. The valve 23 is illustrated in a first position a and in a second position b. In the first position a, the valve 23 substantially completely, preferably completely, prevents air from being able to be supplied from the compartment 7 to the passenger compartment 3. In the second position b, the valve 23 is laterally pivoted and consequently air can be supplied from the compartment 7 to the passenger compartment 3. It is also possible for the valve 23 to be constructed in such a manner that it only partially prevents air from being able to be supplied from the compartment 7 to the passenger compartment 3, or in this construction of the valve 23 air can still be introduced, with a reduced mass, from the compartment 7 into the passenger compartment 3. It is preferable, however, for the valve 23 substantially completely, more preferably completely, to prevent air from being able to be introduced from the compartment 7 into the passenger compartment 3 because, in these embodiments, the desired effects according to the invention which are still being described can be best achieved. An air conveying means which is constructed, for example, as at least one fan and which is not illustrated in FIG. 1 is preferably arranged in the first tubular line 22 and/or in the compartment 7 in order to support the supply of air from the compartment 7 to the passenger compartment 3. The fan has, for example, a supporting effect if the motor vehicle according to the invention is constructed in such a manner that the air is conveyed out of the compartment 7 into the passenger compartment 3 primarily by means of dynamic pressure which is produced when the motor vehicle 1 is moving. The technical effect of the valve 23 will be explained in greater detail below. Should no air be introduced from the compartment 7 into the passenger compartment 3, such as, for example, during travel, through a tunnel, as a result of the harmful gases present in the tunnel, the valve 23 is in the first position a already described before the motor vehicle 1 enters the tunnel. During travel in the tunnel, air arranged in the compartment 7 now leaves the compartment 7 via the second air outlet opening 14 and via the gap 12 into the air outside the motor vehicle 1. Furthermore, warm air outside the motor vehicle 1 or warm external air or warm air present in the tunnel flows via the gap 12 and via the air inlet opening 13 into the compartment 7. That warm air which flows into the compartment 7 may be charged with harmful gases. Should, after the motor vehicle 1 has left the tunnel, air from outside the motor vehicle 1 or external air be supplied to the passenger compartment 3 of the motor vehicle 1 again, the warm air which is arranged in the compartment 7 and which may be charged with harmful gases would flow directly from the compartment 7 into the passenger compartment 3 when the valve 23 is pivoted from the first position a into the second position b. In order to prevent this, the air which is arranged in the compartment 7 and which may be charged with harmful gases is exchanged for air which is charged with fewer harmful gases or no harmful gases outside the motor vehicle 1, which air has a lower temperature than the air present in the tunnel. That air exchange is brought about in the motor vehicle 1 primarily by the dynamic pressure mentioned. The air exchange is preferably supported by an air conveying means which is preferably arranged in the compartment 7 and which is preferably constructed as a fan 24 in order to transport air outside the motor vehicle 1 or external air via the gap 12 and via the air inlet opening 13 into the compartment 7 and in order to transport the air arranged in the compartment 7 to the second air outlet opening 14, via which the air can then leave the compartment 7 and can be introduced via the gap 12 into the air outside the motor vehicle 1. The fan 24 has the advantage that a continuous or a discontinuous air flow can be brought about between the air inlet opening 13 and the second air outlet opening 14 and consequently the air in the compartment 7 can be replaced or exchanged continuously or discontinuously, as necessary. If the warm air which may be charged with harmful gases has left the compartment 7 at least partially, preferably substantially completely, more preferably completely, the valve 23 can be pivoted from the first position a into the second position b and thus the air which has flowed into the compartment 7 from outside the motor vehicle 1 and which has a lower temperature and which is charged with fewer harmful gases or no harmful gases can be directed out of the compartment 7 into the passenger compartment 3. The fan 24 can preferably be controlled so that the fan 24 can be operated and taken out of operation again, as necessary. For the control of the valve 23, there may be provided, for example, air temperature sensors and/or sensors for measuring harmful gases, which are preferably arranged in the compartment 7. Consequently, the motor vehicle 1 according to the invention affords the advantage that air at a lower temperature can be conveyed into the passenger compartment 3 and/or that it is possible to prevent harmful gases which are contained in the air outside the motor vehicle 1 from being able to be introduced into the passenger compartment 3. The motor vehicle 1 illustrated in FIG. 1 does not have an air-conditioning system but may of course also contain an air-conditioning system which, for example, directly adjoins the first tubular line 22 so that air can flow into the passenger compartment 3 from the compartment 7 via the first air outlet opening 18 and via the first tubular line 22 and via the air-conditioning system.

Figure 2:
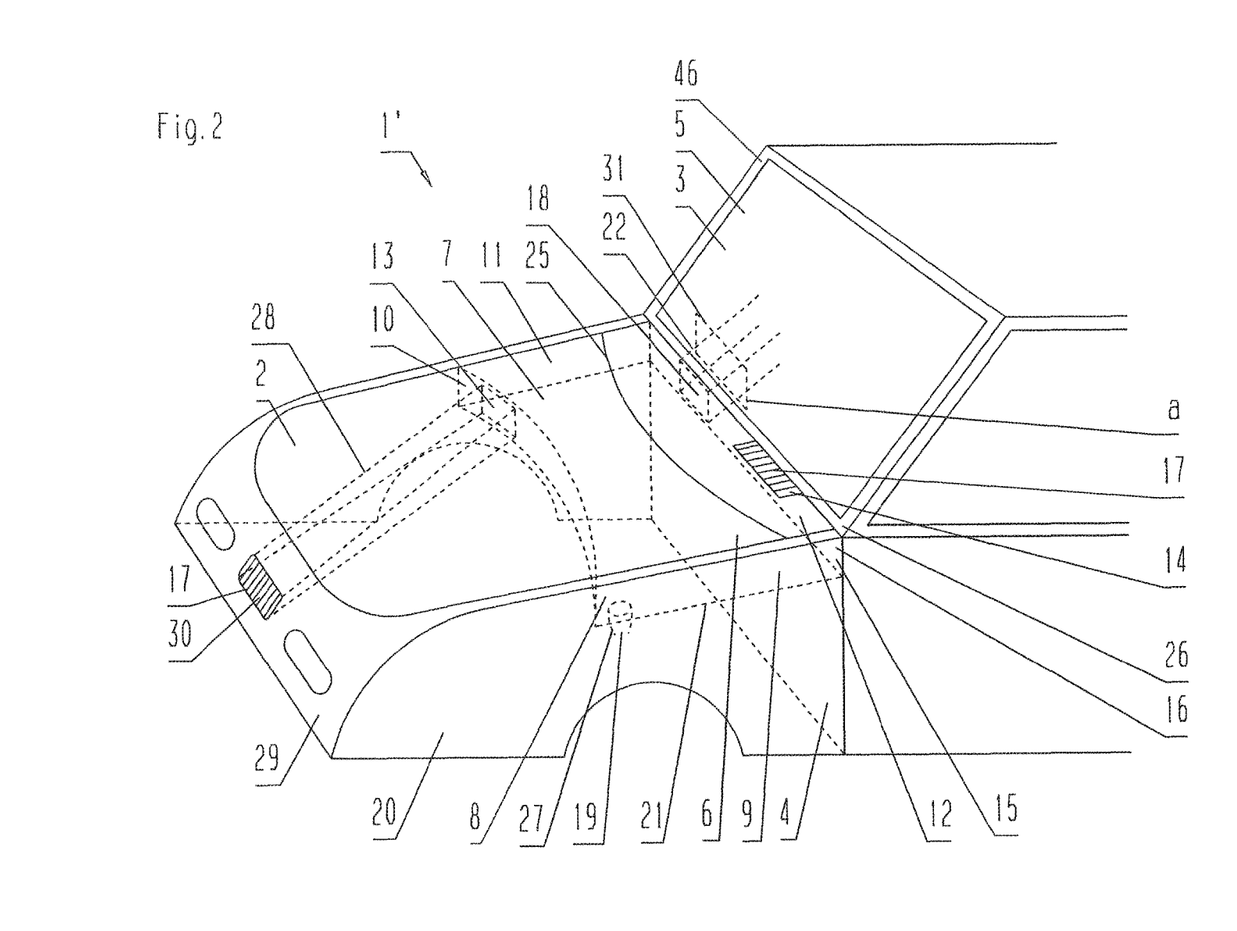
FIG. 2 is a schematic spatial view of a front region of a second embodiment of the motor vehicle according to the invention.

FIG. 2 is a schematic spatial view of a front region of a second embodiment of the motor vehicle according to the invention. The motor vehicle 1' according to FIG. 2 is constructed substantially identically to the motor vehicle 1 according to FIG. 1. In contrast to the motor vehicle 1 according to FIG. 1, in the motor vehicle 1' according to the invention according to FIG. 2, the air inlet opening 13 is not arranged in the top wall 11 but instead in the side wall 10 of the box 21, wherein this air inlet opening 13 arranged in the side wall 10 is not covered with the grid 17, as can be seen in FIG. 2. This air inlet opening 13 is connected to an air inlet opening 30 which is covered with a grid 17 and which is arranged in a front region 29 of the motor vehicle 1' via a third tubular line 28 which is arranged in the engine compartment 2 and under the engine hood 6 and which is illustrated with broken lines. Consequently, the compartment 7 is connected to the air outside the motor vehicle 1' or the external air via the air inlet opening 13, the third tubular line 28 and the air inlet opening 30. Consequently, air outside the motor vehicle 1' or external air can be introduced into the compartment 7 from the front region. 29 of the motor vehicle 1' via the air inlet opening 30, the third tubular line 28 and the air inlet opening 13. In contrast to the motor vehicle 1 according to FIG. 1, means which are not constructed as a valve 23 but instead means which are constructed as sliding members 31 are arranged in the first tubular line 22 which adjoins the first air outlet opening 18. In the first position a illustrated in FIG. 2, the sliding member 31 completely closes the first tubular line 22 so that no air can be introduced into the passenger compartment 3 from the compartment 7 via the first air outlet opening 18 and via the first tubular line 22. The sliding member 31 preferably takes up this first position a during, for example, travel in a tunnel. During the travel of the motor vehicle 1', air outside the motor vehicle 1' now flows as a result of the dynamic pressure from the front region 29 of the motor vehicle 1' via the air inlet opening 30, the third tubular line 28 and the air inlet opening 13 into the compartment 7, travels through the compartment 7 and leaves the compartment 7 again via the second air outlet opening 14. During the travel of the motor vehicle 1' at sufficient speed, consequently, a continuous exchange of the air arranged in the compartment 7 takes place so that an undesirable increase of the temperature of the air arranged in the compartment 7 can be substantially prevented, for example, as a result of the waste heat of the engine of the motor vehicle 1' and/or an undesirable increase of the temperature of the air arranged in the compartment 7 as a result of any sunshine. An increase of the temperature of the air arranged in the compartment 7 is undesirable, for example, when the air outside the motor vehicle 1' already has a high temperature as, for example, in summer or in hot climates. Should air outside the motor vehicle 1' or external air now be supplied to the passenger compartment 3, the sliding member 31 can be displaced laterally into a position b not illustrated in FIG. 2 so that air can be conveyed out of the compartment 7 into the passenger compartment 3 by means of the dynamic pressure via the first air outlet opening 18 and the first tubular line 22. In the event of travel through a tunnel, there is first a waiting time until the motor vehicle 1' has left the tunnel. After the tunnel has been left, the warm air which is arranged in the compartment 7 and in the third tubular line 28, which is charged with harmful gases and which originates from the tunnel is at least partially, preferably completely replaced with or exchanged for, by means of the dynamic pressure, air outside the motor vehicle 1' which has fewer harmful gases or no harmful gases and a lower temperature in comparison. Subsequently, the sliding member 31 is displaced laterally into the second position b which is not illustrated in FIG. 2 so that air can flow into the passenger compartment 3 by means of the dynamic pressure out of the compartment 7 via the first air outlet opening 18 and the first tubular line 22. Consequently, the motor vehicle 1' comprises an air conveying means comprising the third tubular line 28 and the components (not illustrated in FIG. 2) of the motor vehicle 1' according to the invention which can cause the motor vehicle 1' to move, wherein the tubular line 28 and the mentioned components of the motor vehicle 1' together ensure the transport of air outside the motor vehicle 1' or external air into the compartment 7 and the transport of air out of the compartment 7. Of course, the motor vehicle 1' can further have at least one additional air conveying means, such as, for example, a controllable air conveying means, such as, for example, a fan, with which the transport of air outside the motor vehicle 1' can be selectively supported or brought about by means of the air inlet opening 30, the third tubular line 28, the air inlet opening 13, the compartment 7 and the second air outlet opening 14 and/or the first air outlet opening 18. Such an additional air conveying means acts in a supporting manner, for example, in the situation in which the motor vehicle 1' travels slowly and therefore there may not be sufficient dynamic pressure. If the motor vehicle 1' is stopped, there is no dynamic pressure. In this situation, the additional air conveying means can bring about the air transport.

Figure 3:
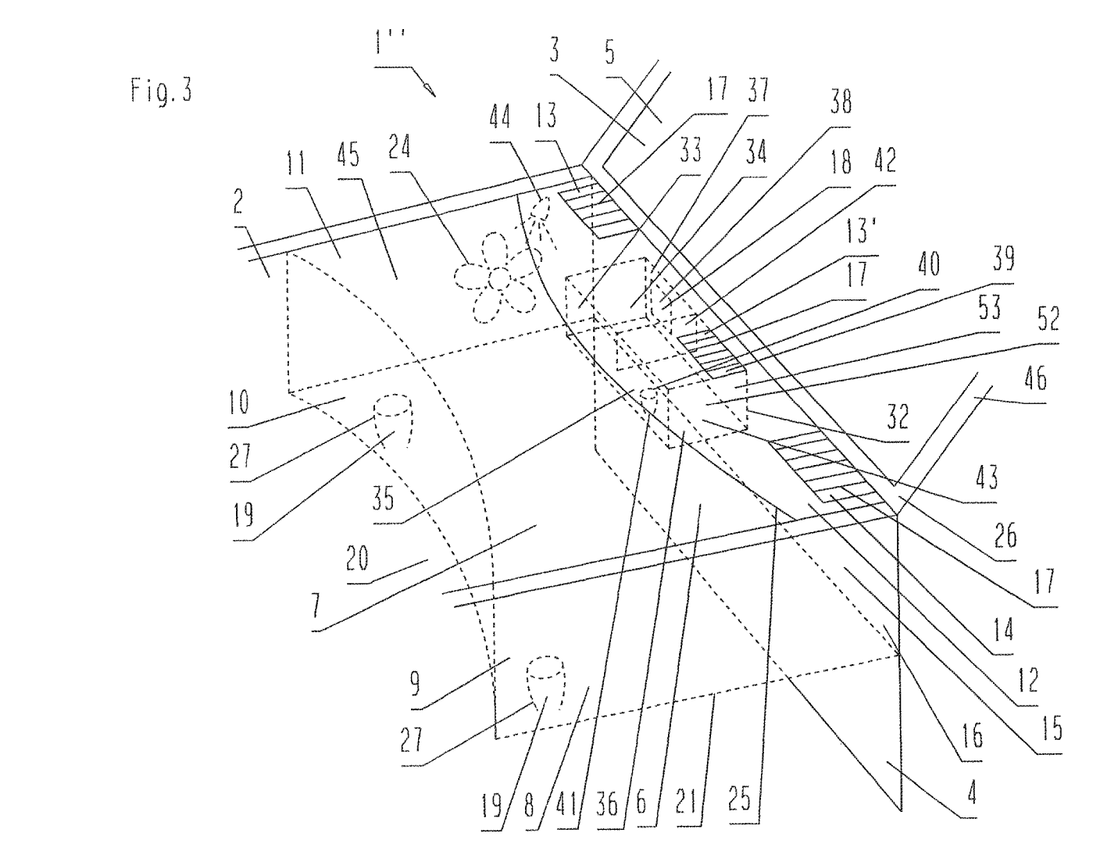
FIG. 3 is a schematic spatial view of a portion of a front region of a third embodiment of the motor vehicle according to the invention.

FIG. 3 is a schematic spatial view of a portion of a front region of a third embodiment of the motor vehicle according to the invention. This motor vehicle 1" comprises an engine compartment 2 and a passenger compartment 3, wherein the engine compartment 2 is separated from the passenger compartment 3 by a front wall 4. The motor vehicle 1" has a front windshield 5 which is surrounded by a part-region 26 of the bodywork 46 of the motor vehicle 1" and an engine hood 6, wherein the engine hood 6 covers the engine compartment 2 and wherein, as can be seen in FIG. 3, a gap 12 is arranged between the mentioned part-region 26 of the bodywork 46 and an edge 25 of the engine hood 6. There is constructed in the engine compartment 2 a completely closed compartment 7 which is preferably constructed as an assembly compartment which is delimited by a wall 8 which is illustrated with broken lines and which comprises a bottom wall 9, a side wall 10 and a top wall 11 which together form a box 21 which extends substantially over the entire width of the motor vehicle 1". The top wall 11 is preferably fixed to the peripheral side wall 10 which extends upward from the bottom wall 9 preferably in a releasable manner, more preferably in a releasable and air-tight manner. Consequently, the compartment 7 can be maintained more easily. As can be seen in FIG. 3, a part-region. 15 of the side wall 10 of the wall 8 forms a part-region 16 of the front wall 4. There is arranged in the top wall 11 an air inlet opening 13 which is arranged under a gap 12 which is also referred to as a hood gap and in which air inlet opening 13 a grid 17 is inserted in order in particular to prevent the introduction of planar components into the air inlet opening 13, wherein the compartment 7 is connected to the air outside the motor vehicle 1" or the external air via the air inlet opening 13 and the gap 12 in order to supply air outside the motor vehicle 1" or external air to the compartment 7.

There is further arranged in the top wall 11 a second air outlet opening 14 which is also arranged under the gap 12 and in which a grid. 17 is inserted in order in particular to prevent the introduction of planar components into the second air outlet opening 14, wherein the compartment 7 is connected to the air outside the motor vehicle 1" via the second air outlet opening 14 and the gap 12 in order to discharge air out of the compartment 7 into the air outside the motor vehicle 1". In order to discharge from the compartment 7 water which is introduced into the compartment 7 through the gap 12 and the air inlet opening 13 and/or the second air outlet opening 14, such as, for example, water which flows away over the front windshield 5 and/or the engine hood 6 and which is introduced into the compartment 7 via the gap 12 and the air inlet opening 13 and/or the second air outlet opening 14, the compartment 7 can be connected to a surrounding compartment 20 which partially surrounds the compartment 7 and which forms a part-region of the engine compartment 2 by means of two mutually opposing water discharge openings 19 which are arranged in the bottom wall 9. The box 21 has two valves 2, wherein the valves 27 are in the open state in the case illustrated in FIG. 3 and consequently the compartment 7 is connected to the surrounding compartment 20, and consequently water arranged in the compartment 7 can be discharged from the compartment 7 into the surrounding compartment 20. The valves 27 can close automatically so that no air can be introduced into the compartment 7 from the engine compartment 2.

The motor vehicle 1" has a completely closed water box 32 which is completely arranged in the compartment 7. The basic construction and the basic operation of a water box are known to the person skilled in the art. The water box 32 is preferably produced substantially from plastics material. The water box 32 comprises a wall 33 which forms an inner side 52 of the water box 32, wherein the inner side 52 delimits an inner compartment 34 of the water box 32. As cart be seen in FIG. 3, a part-region 45 of the compartment 7 and the inner compartment 34 of the water box 32 together substantially form the compartment 7. The wall 33 comprises a bottom wall 35, a peripheral side wall 36 which extends upward from the bottom wall 35 and a top wall 37 which is releasably fixed to an upper region of the side wall 36, preferably releasably fixed in an air-tight manner, which together delimit the inner compartment 34. The releasable fixing of the top wall 37 affords the advantage that the inner compartment 34 of the water box 32 can be maintained more readily. As can be seen in FIG. 3, a part-region 53 of the side wall 36 of the water box 1" forms a part-region of the part-region 16 of the front wall 4. The water box 32 has an air discharge opening 38 which is arranged in the part-region 53 in order to discharge air into the passenger compartment 3 from the inner compartment 34. In the embodiment of the motor vehicle 1" according to the invention as illustrated in FIG. 3, consequently, the air discharge opening 38 of the water box 32 forms a first air outlet opening 18, via which the compartment 7 is connected to the passenger compartment 3 in order to supply air from the compartment 7 to the passenger compartment 3.

The water box 32 further has an air supply opening 39 which is arranged in the top wall 37 of the water box 32 in order to supply air from outside the motor vehicle 1" into the inner compartment 34 of the water box 32, wherein a grid 17 is inserted in the air supply opening 39. The air supply opening 39 of the water box 32 is arranged in the top wall 11 of the wall 8 which delimits the compartment 7 and consequently forms an air inlet opening 13' in order to supply air outside the motor vehicle 1" to the compartment 7. Furthermore, the water box 32 has a valve 40 which can be opened and closed again in the top wall 35, wherein the valve 40 forms a water discharge opening 41, via which water can be discharged out of the inner compartment 34 of the water box 32 into the compartment 7, from which compartment 7 the water can again be separated via the valves 27 out of the compartment 7 into the surrounding compartment 20. The valve 40 prevents external air from being able to be introduced from the compartment 7 into the inner compartment 34 of the water box 32. The valve 40 is preferably produced from an elastomer material.

Air can now flow from outside the motor vehicle 1" into the inner compartment 34 of the water box 32 via the gap 12 and the air supply opening 39 or the air inlet opening 13'. This incoming air flows round a redirecting element 42 which is arranged in the inner compartment 34 and which extends from the top wall 37 in the direction of the bottom wall 35, wherein any water which may be contained in the air, in particular drop-like water, can be separated from the air as a result of the vertical flowing operation. Any water separated is discharged from the water box 32 via the valve 40. After flowing round the redirecting element 42, the air continues to flow in the inner compartment 34 and leaves the inner compartment 34 of the water box 32 via the air discharge opening 38 or the first air discharge opening 18 into an air-conditioning system which is directly adjacent to the air discharge opening 38, which is not illustrated in FIG. 3, which is connected to the passenger compartment 3 in fluid terms and which has at least one air conveying means, a heating unit for heating the air which is intended to be supplied to the passenger compartment 3 and which flows through the air-conditioning system and an evaporator for cooling the air which is intended to be supplied to the passenger compartment 3 and which flows through the air-conditioning system.

As can be seen in FIG. 3, a large portion of an outer side 43 of the water box 32 formed by the wall 33 of the water box 32 is surrounded by the air which is arranged in the part-region. 45 of the compartment 7. That air arranged in the part-region 45 of the compartment 7 has a thermally insulating action with respect to the water box 32 so that the air from outside the motor vehicle 1" or the external air which flows through the inner compartment 34 of the water box 32 is not heated so powerfully by the heat which occurs, for example, as a result of the operation of the motor vehicle 1", such as, for example, as a result of the operation of the engine, or as a result of the sunshine. The evaporator which is arranged in the mentioned air-conditioning system which is not illustrated in FIG. 3 must therefore operate less powerfully and consequently the energy consumption of the motor vehicle 1" can be reduced. If the air arranged in the part-region 45 of the compartment 7 reaches a specific temperature at which it no longer acts in a thermally insulating manner, the air in the part-region 45 of the compartment 7 can be exchanged actively or in a controlled manner for air having a lower temperature by air from outside the motor vehicle 1" or external air flowing via the gap 12 and the air inlet opening 13 into the part-region 45 of the compartment 7 and the heated air which is arranged in the part-region 45 of the compartment 7 leaving the part-region 45 of the compartment 7 via the second air outlet opening 14. There is preferably a continuous air exchange in the part-region 45 of the compartment 7 in order to achieve a substantially constantly low temperature of the air arranged in the part-region 45 of the compartment 7. That active or controlled continuous air exchange or discontinuous air exchange in the part-region 45 of the compartment 7 is brought about by the operation of the air conveying means which is arranged in the part-region 45 of the compartment 7 and which is constructed as a fan 24. As FIG. 3 shows, the air which flows from the air inlet opening 13 through the part-region 45 of the compartment 7 to the second air outlet opening 14 is spatially separated from the air which flows from the air inlet opening 13' or the air supply opening 39 through the inner compartment 34 of the water box 32 to the first air outlet opening 18 or the air discharge opening 38 and consequently the air arranged in the part-region 45 of the compartment 7 cannot mix with the air arranged in the inner compartment 34. In order to cool the air arranged in the part-region 45 of the compartment 7, a nozzle 44 is further arranged in the part-region 45 of the compartment 7. The motor vehicle 1" further has means for supplying the condensation water which is produced at the evaporator of the air-conditioning system of the motor vehicle 1" to the nozzle 44. The nozzle 44 brings the condensation water which is indicated with broken lines in FIG. 3 to the fan 24 and the rotating fan 24 then distributes the condensation water in the part-region 45 of the compartment 7 so that the condensation water distributed in the part-region 45 of the compartment 7 brings about an evaporation cooling of the air arranged in the part-region 45 of the compartment 7.

As a result of the described discontinuous or continuous exchange of the air arranged in the part-region 45 of the compartment 7 or as a result of the discontinuous or continuous exchange of the insulation means "air" in the part-region 45 of the compartment 7, the wall 8 which delimits the compartment 7 and/or the wall 33 of the water box 32 can be thermally insulated to a lesser extent or a thermal insulation of the wall 8 and/or the wall 33 can be dispensed with at least partially or completely. Since it is possible at least partially or even completely to dispense with a thermal insulation of the wall 8 and/or the wall 33 or the wall 8 and/or the wall 33 can be thermally insulated to a lesser extent, in comparison with motor vehicles of the prior art at low temperatures of the air outside the motor vehicle 1", such as, for example, in winter or in cold climates, the waste heat of the engine or the sunshine can be better utilized or selectively used in order to achieve a desired heating of the air which is from outside the motor vehicle 1" and which is intended to be supplied to the passenger compartment 3 via the water box 32 or the external air which is intended to be supplied to the passenger compartment 3. In winter or in cold climates, consequently, the heating of the air-conditioning system of the motor vehicle 1" has to operate less in order to heat the air which is from outside the motor vehicle 1" and which is intended to be supplied to the passenger compartment 3 or the external air which is intended to be supplied to the passenger compartment 3, and consequently energy can be saved. The motor vehicle 1" according to the invention consequently has in comparison with a motor vehicle of the prior art the advantage that the energy consumption is lower at low temperatures of the air outside the motor vehicle 1", such as, for example, in winter or in cold climates.

Figure 4:
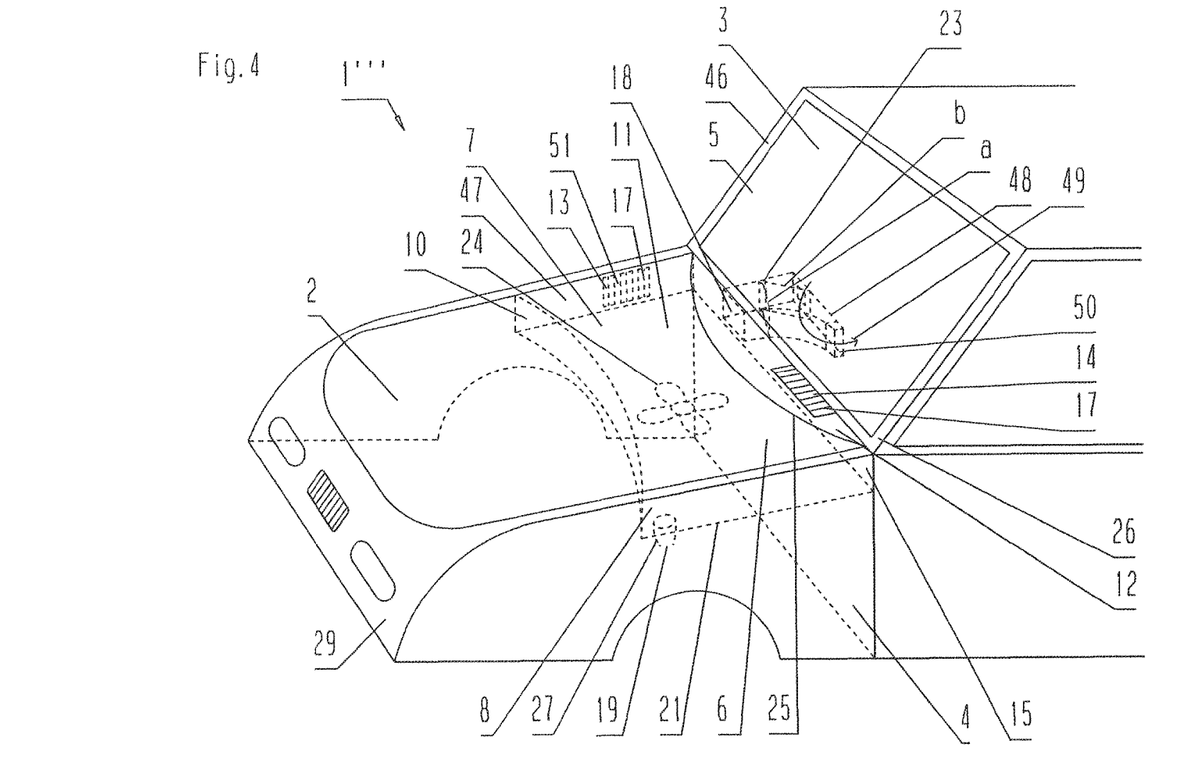
FIG. 4 is a schematic spatial view of a fourth embodiment of the motor vehicle according to the invention.

FIG. 4 is a schematic spatial view of a front region of a fourth embodiment of the motor vehicle according to the invention. The motor vehicle 1'" according to FIG. 4 is constructed substantially identically to the motor vehicle 1 according to FIG. 1. In contrast to the motor vehicle 1 according to FIG. 1, in the motor vehicle 1'" according to the invention according to FIG. 4 the air inlet opening 13 is arranged not in the top wall 11 but instead in the side wall 10 of the box 21, wherein this air inlet opening 13 arranged in the side wall 10 is covered with a grid. 17, as can be seen in FIG. 4. That air inlet opening 13 is connected to the air outside the motor vehicle 1''' via an air inlet opening 51 which is arranged in a lateral region 47 formed by the bodywork 46 of the motor vehicle 1'''. The compartment 7 is consequently connected to the air outside the motor vehicle 1''' or the external air via the air inlet opening 51 arranged in the bodywork 46 and the air inlet opening 13. Consequently, air outside the motor vehicle 1''' or external air can be introduced into the compartment 7 from the lateral region 47 of the motor vehicle 1''' via the air inlet opening 51 which is arranged in the bodywork 46 or in the lateral region 47 and the air inlet opening 13, can flow through the compartment 7 and can leave the compartment 7 again via the second air outlet opening 14 and/or the first air outlet opening 18. In order to draw in air into the compartment 7 from outside the motor vehicle 1''' through the air inlet opening 51 which is arranged in the bodywork 46 or in the lateral region 47 and the air inlet opening 13, to transport it through the compartment 7 and to transport it out of the compartment 7 through the second air outlet opening 14 and/or the first air outlet opening 18, a fan 24 is provided in the compartment 7. In contrast to the motor vehicle 1, the first air outlet opening 18 in the motor vehicle 1''' is connected to the passenger compartment 3 not via the first tubular line 22 but instead via a schematically illustrated air-conditioning system 48, in order to supply air from the compartment 7 to the passenger compartment 3. As can be seen in FIG. 4, the air-conditioning system 48 is arranged at the passenger compartment side of the front wall 4. The air-conditioning system 48 has a fan which is not illustrated in order to transport air from the compartment 7 into the passenger compartment 3, an evaporator 50 for cooling air which flows through the air-conditioning system 48 and which is intended to be supplied to the passenger compartment 3, and a valve 23 which is illustrated in a first position a and a second position b. In principle, the person skilled in the art is familiar with the construction and operation of an air-conditioning system. In the position a of the valve 23, no air can be guided from the compartment 7 into the passenger compartment 3 because the air-conditioning system 48 is closed by the valve 23. The air-conditioning system 48 is consequently operated with air recirculation operation, that is to say, in accordance with arrow 49, air flows out of the passenger compartment 3 into the air-conditioning system 48 and out of the air-conditioning system 48 again into the passenger compartment 3. If the valve 23 is pivoted from the position a into the position b, air can be introduced from the compartment 7 into the passenger compartment 3 via the air-conditioning system 48. In the case, for example, of travel in a tunnel, the air-conditioning system 48 can be guided with air recirculation operation. If the motor vehicle 1''' leaves the tunnel, the warm tunnel air which has flowed into the compartment 7 during travel in the tunnel and which may be charged with harmful gases can be exchanged as a result of the operation of the fan 24 for air from outside the motor vehicle 1''' or external air or air which has a lower temperature and which is charged with fewer harmful gases or no harmful gases. After complete exchange of the warm air which is arranged in the compartment 7 and which may be charged with harmful gases, the valve 23 can be pivoted into the position b and air can be transported out of the compartment 7 into the passenger compartment 3 by means of operation of the fan which is contained in the air-conditioning system 48 and which is not illustrated in FIG. 4. The motor vehicle according to the invention consequently affords the advantage that air of a better quality and/or having a lower temperature can be transported into the passenger compartment 3. Furthermore, as a result of the lower temperature of the air transported into the passenger compartment 3, the evaporator 50 has to operate less or carry out less cooling work and consequently the energy consumption of the motor vehicle 1''' according to the invention is lower.

The above invention is of course not limited to the embodiments described and a large number of modifications are possible. Thus, for example, the compartment 7 or the wall 8 of the motor vehicles delimiting the compartment according to FIGS. 1 to 4 may have a different form and/or different dimensions to the illustration in FIGS. 1 to 4. Furthermore, for example, the motor vehicles according to FIGS. 1 to 4 may have a larger number of air inlet openings 13, first air outlet openings 18, second air outlet openings 14 or water discharge openings 19, than in the illustration in FIGS. 1 to 4. Furthermore, the motor vehicles according to FIGS. 1, 3, 4 may have, for example, a different number of air conveying means or fans 24 from the illustration in FIGS. 1, 3, 4 and they may also be arranged differently in the compartment 7 from the illustration in FIGS. 1, 3, 4. Furthermore, for example, the water box 32 according to FIG. 3 may have a different form and/or different dimensions from the illustration in FIG. 3. Furthermore, for example, the water box 32 according to FIG. 3 may have a larger number of air discharge openings 38, air supply openings 39 or water discharge openings 41 than in the illustration of FIG. 3. The water box 32 according to FIG. 3 does not necessarily have to have a redirecting element 42, but preferably has such an element. Furthermore, the water box 32 may be arranged in the compartment 7 differently from the illustration in FIG. 3 so that a larger part-region of the outer side 43 of the water box 32 is surrounded or can be flowed round by the air arranged in the part-region 45 of the compartment 7. It is thereby possible to further increase the insulation action of the air arranged in the part-region 45 of the compartment 7 with respect to the water box 32. A large number of additional modifications are possible.

LIST OF REFERENCE NUMERALS

1 Motor vehicle
1' Motor vehicle
1'' Motor vehicle
1''' Motor vehicle
2 Engine compartment
3 Passenger compartment
4 Front wall
5 Front windshield
6 Engine hood
7 Compartment
8 Wall
9 Bottom wall
10 Side wall
11 Top wall
12 Gap
13 Air inlet opening
13' Air inlet opening
14 Second air outlet opening
15 Part-region of side wall 10
16 Part-region of front wall 4
17 Grid
18 First air outlet opening
19 Water discharge opening
20 Surrounding compartment
21 Box 22 First tubular line
23 Valve
24 Fan
25 Edge of engine hood 6
26 Part-region of bodywork 46
27 Valve
28 Third tubular line
29 Front region
30 Air inlet opening in front region 29
31 Sliding member
32 Water box
33 Wall
34 Inner compartment
35 Bottom wall
36 Side wall
37 Top wall
38 Air discharge opening
39 Air supply opening
40 Valve
41 Water discharge opening
42 Redirecting element
43 Outer side
44 Nozzle
45 Part-region of compartment 7
46 Bodywork
47 Lateral region
48 Air-conditioning system
49 Arrow
50 Evaporator
51 Air inlet opening in lateral region 47
52 Inner side
53 Part-region of side wall 36
a First position
b Second position

The invention claimed is:

1. A motor vehicle comprising:
a passenger compartment,
an engine compartment,
an at least substantially closed compartment arranged in the engine compartment, the at least substantially closed compartment being delimited by a wall comprising a bottom wall, a side wall and a top wall,
at least a first air outlet opening which connects the at least substantially closed compartment to the passenger compartment in order to supply air from the at least substantially closed compartment into the passenger compartment,
at least one air inlet opening which connects the at least substantially closed compartment to the air outside the motor vehicle in order to supply air from outside the motor vehicle into the at least substantially closed compartment,
at least a second air outlet opening being connected to the at least substantially closed compartment in order to discharge air from the at least substantially closed compartment into the air outside the motor vehicle, wherein at least one of the at least one second air outlet opening is arranged in the side wall and/or in the top wall, and
an at least substantially closed water box which is at least partially arranged in the at least substantially closed compartment so that at least a part-region of an outer side of the at least substantially closed water box is surrounded by air which is arranged in the at least substantially closed compartment,
wherein the at least substantially closed water box has an inner compartment which is delimited by an inner side of the at least substantially closed water box, at least one air supply opening in order to supply air from outside the motor vehicle into the inner compartment, at least one air discharge opening in order to discharge air from the inner compartment to the passenger compartment and at least one water discharge opening in order to discharge water from the inner compartment, and
wherein the inner compartment connects the air supply opening, the air discharge opening and the water discharge opening to each other.

2. The motor vehicle as claimed in claim 1, wherein the motor vehicle has at least one element which is suitable for at least partially preventing the supply of air from the at least substantially closed compartment via the first air outlet opening into the passenger compartment.

3. The motor vehicle as claimed in claim 1, wherein at least one of the at least one air discharge opening(s) of the at least substantially closed water box forms(s) at least one of the at least one first air outlet opening(s).

4. The motor vehicle as claimed in claim 1, wherein at least one of the at least one air supply opening(s) of the at least substantially closed water box form(s) at least one of the at least one air inlet opening(s).

5. The motor vehicle as claimed in claim 1, wherein the at least substantially closed compartment is connected to at least one air inlet opening which is arranged in at least one front region of the motor vehicle via at least one of the at least one air inlet opening(s) in order to supply air from outside the motor vehicle into the at least substantially closed compartment.

6. The motor vehicle as claimed in claim 1, wherein the at least substantially closed compartment is connected to at least one air inlet opening which is arranged in at least one lateral region of the motor vehicle via at least one of the at least one air inlet opening(s) in order to supply air from outside the motor vehicle into the at least substantially closed compartment.

7. The motor vehicle as claimed in claim 1, wherein the at least substantially closed compartment is connected to at least one air inlet opening which is arranged in at least one upper region of the motor vehicle via at least one of the at least one air inlet opening(s) in order to supply air from outside the motor vehicle into the at least substantially closed compartment.

8. The motor vehicle as claimed in claim 1, wherein the motor vehicle has at least one air conveying device in order to transport air from outside the motor vehicle into the at least substantially closed compartment and to transport air out of the at least substantially closed compartment.

9. The motor vehicle as claimed in claim 8, wherein the at least one air conveying device is arranged in the at least substantially closed compartment.

10. The motor vehicle as claimed in claim 1, wherein the at least substantially closed compartment is connected to a surrounding compartment which at least partially surrounds the at least substantially closed compartment via at least one water discharge opening in order to discharge water from the at least substantially closed compartment into the surrounding compartment which at least partially surrounds the at least substantially closed compartment.

11. The motor vehicle as claimed in claim 1, wherein the motor vehicle has an air-conditioning system which is connected to the passenger compartment in order to supply air from the air-conditioning system into the passenger compartment, wherein the at least substantially closed compartment is connected to the air-conditioning system via the first air outlet opening in order to supply air from the at least substantially closed compartment into the air-conditioning system.

12. The motor vehicle as claimed in claim 11, wherein the air-conditioning system is constructed in such a manner that the air-conditioning system can be operated with air recirculation operation.

13. The motor vehicle as claimed in claim 11, wherein the air-conditioning system has at least one evaporator which generates condensation water, wherein the motor vehicle has a mechanism for supplying the condensation water to the at least substantially closed compartment and for spraying the condensation water supplied to the at least substantially closed compartment in the at least substantially closed compartment in order to bring about an evaporation cooling of the air arranged in the at least substantially closed compartment.

14. The motor vehicle as claimed in claim 1, wherein the motor vehicle has at least one element which is suitable for completely preventing the supply of air from the at least substantially closed compartment via the first air outlet opening into the passenger compartment.

15. The motor vehicle as claimed in claim 1, wherein at least one of the at least one air discharge opening(s) of the at least substantially closed water box is connected to at least one of the at least one first air outlet opening(s) in fluid terms.

16. The motor vehicle as claimed in claim 1, wherein at least one of the at least one air supply opening(s) of the at least substantially closed water box is connected in fluid terms to at least one of the at least one air inlet opening(s).

17. A method for operating a motor vehicle having
a passenger compartment,
an engine compartment,
an at least substantially closed compartment arranged in the engine compartment, the at least substantially closed compartment being delimited by a wall comprising a bottom wall, a side wall and a top wall,
at least a first air outlet opening which connects the at least substantially closed compartment to the passenger compartment in order to supply air from the at least substantially closed compartment into the passenger compartment,
at least one air inlet opening which connects the at least substantially closed compartment to the air outside the motor vehicle in order to supply air from outside the motor vehicle into the at least substantially closed compartment,
at least a second air outlet opening being connected to the at least substantially closed compartment in order to discharge air from the at least substantially closed compartment into the air outside the motor vehicle, wherein at least one of the at least one second air outlet opening is arranged in the side wall and/or in the top wall,
and an at least substantially closed water box which is at least partially arranged in the at least substantially closed compartment so that at least a part-region of an outer side of the at least substantially closed water box is surrounded by air which is arranged in the at least substantially closed compartment, wherein the at least substantially closed water box has an inner compartment which is delimited by an inner side of the at least substantially closed water box, at least one air supply opening in order to supply air from outside the motor vehicle into the inner compartment, at least one air discharge opening in order to discharge air from the inner compartment to the passenger compartment and at least one water discharge opening in order to discharge water from the inner compartment, wherein the inner compartment connects the air supply opening, the air discharge opening and the water discharge opening to each other,
wherein the motor vehicle is operated in such a manner that
air flows between at least one of the at least one air inlet opening(s) and at least one of the at least one second air outlet opening(s) and between at least one additional of the at least one air inlet opening(s) and at least one of the at least one first air outlet opening(s) at the same time, or that
air flows between at least one of the at least one air inlet opening(s) and at least one of the at least one second air outlet opening(s) and between at least one of the at least one air inlet opening(s) and at least one of the at least one first air outlet opening(s) in a manner offset over time.

\* \* \* \* \*